United States Patent [19]
Munch et al.

[11] Patent Number: 5,641,355
[45] Date of Patent: Jun. 24, 1997

[54] EXTRUSION COATER FOR THE PRODUCTION OF A MAGNETIC RECORDING MEDIUM

[75] Inventors: Michel Munch, Illkirch-Graffenstaden, France; Ingo Blaul; Peter Nagel, both of Willstätt, Germany

[73] Assignee: BASF Magnetics GmbH, Mannheim, Germany

[21] Appl. No.: 566,699

[22] Filed: Dec. 4, 1995

[30] Foreign Application Priority Data

Dec. 9, 1994 [DE] Germany .......................... 44 43 896.6

[51] Int. Cl.$^6$ ........................................................... B05C 3/02
[52] U.S. Cl. ............................................. 118/410; 118/419
[58] Field of Search .................................... 118/410, 411, 118/419; 427/356, 549

[56] References Cited

U.S. PATENT DOCUMENTS 3,681,138  8/1972  Ankenbrand et al. .................. 118/410
4,943,451  7/1990  Zimmer ................................. 118/410

*Primary Examiner*—Brenda A. Lamb
*Attorney, Agent, or Firm*—Keil & Weinkauf

[57] ABSTRACT

An extrusion coater for the production of a magnetic recording medium having at least one coater slot is described, the lower lip arranged in a direction opposite to the running direction of the substrate and displaced forward relative to the upper lip containing, in its interior, a permanent magnet which is oriented approximately parallel to the upper edge of the lower lip and whose field lines are roughly perpendicular to the coating direction of the magnetic dispersion flowing through the coater slot. By means of this arrangement, it is possible substantially to reduce the layer thickness while achieving a satisfactory coating and also considerably to reduce the edge bead.

3 Claims, 4 Drawing Sheets

EXTRUSION COATER FOR THE PRODUCTION OF A MAGNETIC RECORDING MEDIUM

The present invention relates to an extrusion coater for the production of a magnetic recording medium, consisting of a nonmagnetic substrate and at least one magnetic dispersion which is applied thereon and in which finely divided magnetic pigments are finely dispersed in a polymeric binder matrix, the dispersion being exposed, immediately before application to the substrate, to a magnetic field which passes through it and whose field strength is at least as great as the coercive force of the magnetic pigments.

There is a plurality of methods for the application of magnetizable layers. A magnetic dispersion can be applied to the substrate by means of an immersion method, a knife coater, a reverse roll coater or an extrusion coater. The extrusion coater, with the aid of which it is also possible simultaneously to apply a plurality of layers one on top of the other, has the advantage of a closed recycle-free system which meets the necessary cleanliness requirements for the production of a modern magnetic recording medium. Such extrusion coaters, by means of which one or more layers present one on top of the other are applied, have been described in, inter alia, patent applications DE 19 07 212, DE 40 11 279, EP 0 392 810, U.S. Pat. No. 5,072,688 and PCT Application EP 93/02017.

Extrusion coaters known to date have in particular two disadvantages:

In general, it is not possible by means of said coaters to apply individual layers having a dry thickness of less than 1 μm without problems. However, this requirement has arisen in particular for modern magnetic recording media which are intended for recording wavelengths of up to 0.54 mμ with sufficient recording intensity, for example in the case of 8 mm video tapes. In order to overcome this problem, binder-free thin ferromagnetic metal layers have for some time been applied to a nonmagnetic substrate by low pressure vapor deposition. However, this application process is less suitable for mass production than the conventional application method with binder-containing magnetic layers, in particular because the low pressure vaporization method requires very complicated apparatuses and sufficient protection against oxidation of the thin layers thus produced. Another solution, as disclosed, for example, in the patents U.S. Pat. No. 2,819,186, DE 43 02 516 and EP 0 520 155 and EP 0 566 100, comprised applying a thin binder-containing magnetic layer to a nonmagnetic lower layer by the wet-on-wet application method. However, this method gives rise to greater expense both in the design of the extrusion coater and in the production of the magnetic dispersions. Moreover, wavy defects which have an adverse effect on the recording quality may occur at the boundary of nonmagnetic lower layer and magnetic upper layer.

A further disadvantage of the extrusion coater is that a bead, which in some cases is considerable, forms at the two coating edges. There are various proposals for overcoming this. Stripping brushes can be provided at the two coating edges; according to DE 29 36 035, magnetic circuits which are set at an angle of 0.5° to 10° between coating edge and slot center line are arranged at both coating edges, on the side opposite to the magnetic coating, in order further to spread the magnetic coating toward the edges. According to the abovementioned PCT Application EP 93/02017, a stripping plate which is essentially perpendicular to the outlet orifice is mounted at both coating edges, the outflowing coating dispersion running off along the inner surface of the stripping plate and the stripping plate being extended by a certain amount beyond the lower or upper extruder edge in the direction of the material web.

The measures described give rise to additional cost with regard to design and furthermore are not without problems, for example on passing through adhesive parts of the substrate.

A process for the production of a magnetic recording medium of the abovementioned generic type is disclosed in DE 27 52 219. The magnetic dispersion is exposed, in the feed line to a knife coater, to a homogeneous magnetic field which is at least as great as the coercive force of the pigments, in order to improve the orientation of the acicular particles and hence the magnetic values by increasing the residual magnetization in the recording direction. However, only layers having a minimum thickness of 4 μm can be obtained by means of this method. A similar process is disclosed in German Laid-Open Application DOS 2,735,853, in which a free-falling curtain consisting of one or more part-layers and having a length of several centimeters is formed, which curtain, before it is applied to the moving substrate, passes through a magnetic field which penetrates it, in order to improve the orientation of the magnetic particles. The Examples in this application show that, even by means of such a process, only layers having a thickness of at least 3 μm can be produced.

It is an object of the present invention to provide an extrusion coater for the production of a magnetic recording medium which has at least one recording layer and, even in the case of a monolayer, makes it possible to obtain layer thicknesses of less than 1 μm without problems, the edge bead being markedly reduced at the same time.

We have found that this object is achieved, according to the invention, by an extrusion coater having the features stated in the defining clause of the claims. Further details of the invention are evident from the description and the drawings.

The Figures show the following:

Figure 1:
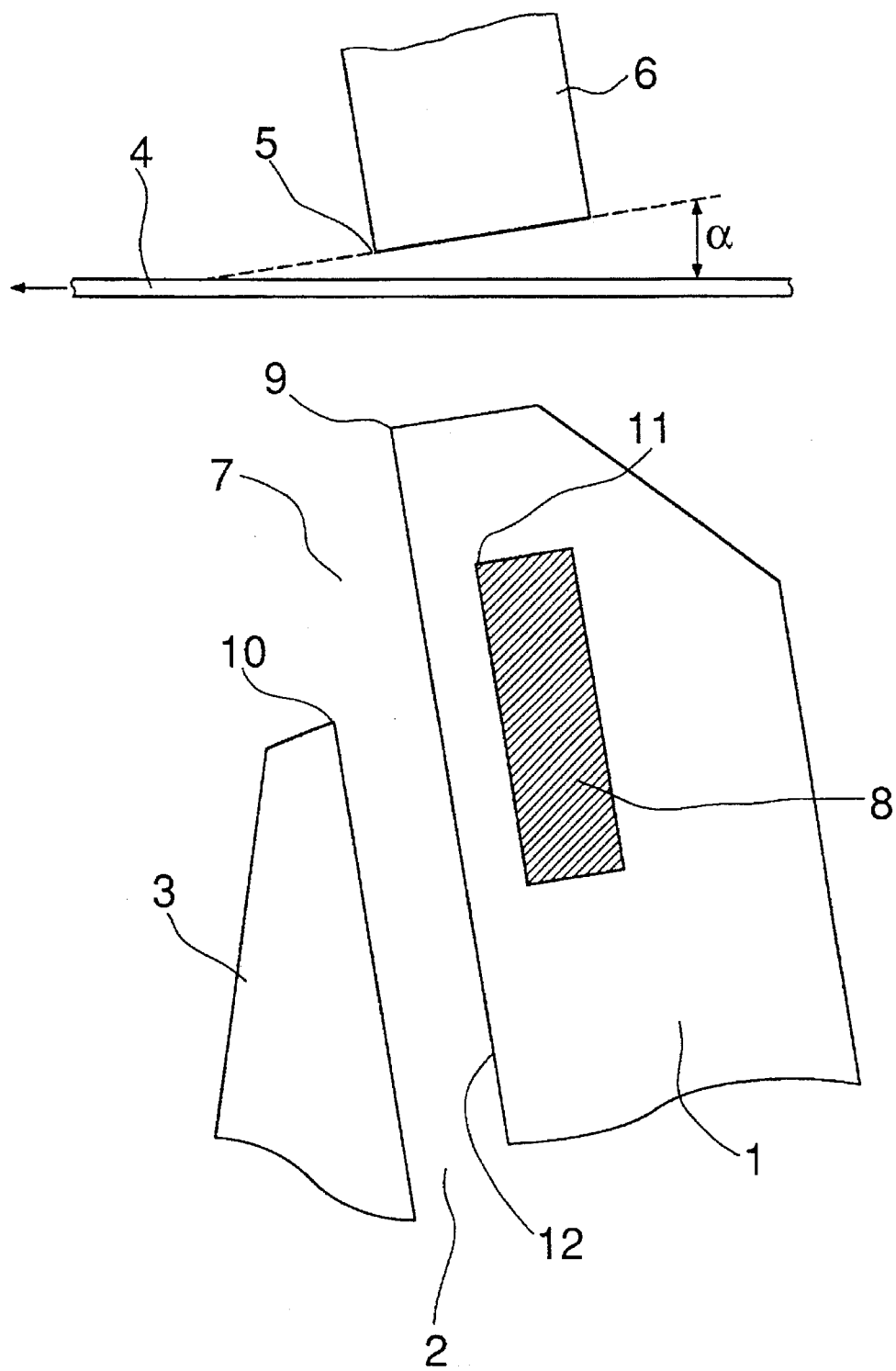
FIG. 1 shows a monoslot extrusion coater having a lip magnet in the lower lip.

The inventive concept was to provide in an extrusion coater, in the lower lip which is displaced forward relative to the upper lip in the direction of the substrate, a magnet whose field strength is at least as great as the coercive force of the magnetic pigments, whose field lines are essentially perpendicular to the direction of flow of the magnetic dispersion and which is arranged in such a way that it promotes the uniform emergence of the magnetic dispersion from the coater slot. Arriving from below, the substrate first passes the lower lip (1) and then the upper lip (3).

The process is particularly suitable in the case of extrusion coaters having one or more coater slots, as described, for example, in DE 19 07 212 or PCT Application EP 93/02017. According to these publications, a right parallelepiped magnet which is essentially parallel to the substrate and whose upper edge is opposite the extruder orifice and a distance away is present as an attracting magnet in these extruder arrangements, opposite the outlet orifice or orifices, on the side opposite the coated side.

The novel process is illustrated below with reference to FIG. 1 and several examples, initially using a monolayer as an example, but without the invention being restricted thereto. The nonmagnetic substrate (4) running in the direction indicated by the arrow moves past the outlet slot (7) of an extrusion coater, consisting of a lower lip (1) and an upper lip (3) with the coater slot (2) present in between, into which the dispersion to be cast is pumped or through which said dispersion is forced from a storage container (not shown) under pressure. The upper lip (3) is recessed relative to the lower lip (1), so that the horizontal distance from the front edge (10) to the front edge (9) of the lower lip is from 0.5 to 1.5 mm. The width of the coater orifice (2) is usually from 0.1 to 0.8 mm.

Opposite the coated side of the substrate (4) is an attracting magnet (6) whose field strength in the running direction of the coated substrate (4) has a magnitude which is at least as great as the coercive force of the magnetic pigments and is from 80 to 400 A/cm, the magnitude of the field gradient of the edge (5) of the magnet, which gradient is directed toward the extruder slot (7), being more than 400 A/cm$^2$. By means of its field lines, the attracting magnet should accelerate the magnetic dispersion from the coater slot (7) in the running direction of the substrate (4). The substrate preferably makes a small angle $\alpha$, which is of the order of magnitude of 1°, with the upper edge (5) of the magnet (6).

As furthermore shown in FIG. 1, a right parallelepiped magnet (8) whose field strength is at least as great as the coercive force of the magnetic pigments which flow through the coater slot (2) is present at a distance of about 2 mm below the upper edge (12) of the lower lip (1), essentially parallel to the edge. The polarity of this magnet is such that its field lines are approximately perpendicular to the coating direction of the magnetic dispersion. The front edge (11) of the magnet (8), which is oriented in the direction of the coater orifice (7), is preferably present between the front edge (10) of the upper lip and the front edge (9) of the lower lip, particularly preferably in the geometric center. It has been found that it is unimportant whether, as shown in FIG. 1, the long edge of the magnet (8) or the short edge is parallel to the upper side of the lower lip. The magnet can also be tilted up to about 25° relative to the upper edge.

In the Examples which follow, the magnet integrated in the lower lip was of the cobalt-samarium type, having a field strength of about 200 kA/m (measured at a distance of 2 mm from the edge of the magnet), a height of 3.5 mm, a length of 10 mm and a width which corresponded roughly to the coating width, the magnet being present about 2 mm below the upper side (12) of the lower lip. It can be laterally inserted into the lower lip. The front edge (11) of the magnet was 0.5 mm away from the front edge (10) of the upper lip in the horizontal direction. The distance of the front edge (9) of the lower lip from the substrate was 1.2 mm. The height of the coater slot was 450 μm. The material of the upper (3) and of the lower lip (1) consists of nonmagnetic stainless steel.

EXAMPLE 1

A magnetic dispersion having the following composition was prepared:

|  | Parts by weight |
| --- | --- |
| Co-doped Fe$_2$O$_3$ with H$_c$ of 60 kA/m and BET value of 25 m$^2$/g | 122 |
| Polyurea (meth)acrylate | 7 |
| Vinyl copolymer | 6 |

-continued

|  | Parts by weight |
| --- | --- |
| Polyesterpolyurethane | 15 |
| Nitrocellulose | 4 |
| Carbon black | 11 |
| Finely divided Al$_2$O$_3$ | 12 |
| Lubricant | 8 |
| Wetting agent | 0.12 |
| Solvent mixture (THF/dioxane) | 750 |
| Diisocyanate curing agent | 9 |

This dispersion was cast on a nonmagnetic polyethylene terephthalate substrate having a thickness of 75 μm at a speed of 500 m/min.

Without the magnet in the lower lip, it was possible to achieve trouble-free coating without stripes and waviness up to 1.5 μm, whereas trouble-free coating was achieved even at 0.7 μm by means of the novel process. The edge bead, which was about 10 μm without the magnet, could be reduced by a factor of 2 to 5 μm with this magnet.

EXAMPLE 2

A magnetic dispersion having the following composition

|  | Parts by weight |
| --- | --- |
| Co-doped finely divided iron powder (BET = 58 m$^2$/g, H$_c$ = 125 kA/m) | 65 |
| Vinyl chloride copolymer | 6 |
| Polycarbonate-polyurethane | 12 |
| Carboxylic acid-containing polyalkylene oxide acrylate (dispersant) | 4 |
| Alumina | 7 |
| Isocyanate (crosslinking agent) | 2 |
| Lubricant | 2.2 |

Solvent for preparation of the dispersion: tetrahydrofuran was cast at a coating speed of 600 m/min on a polyethylene terephthalate substrate having a thickness of 24 μm. Without the lip magnet, it was possible to achieve trouble-free coating only up to a layer thickness of at least 1.2 μm, whereas trouble-free and stripe-free coating could be achieved at a layer thickness as low as 0.4 μm with the integral lip magnet. The edge bead could be reduced from 12 μm (without lip magnet) to 3.5 μm (with lip magnet).

Figure 2:
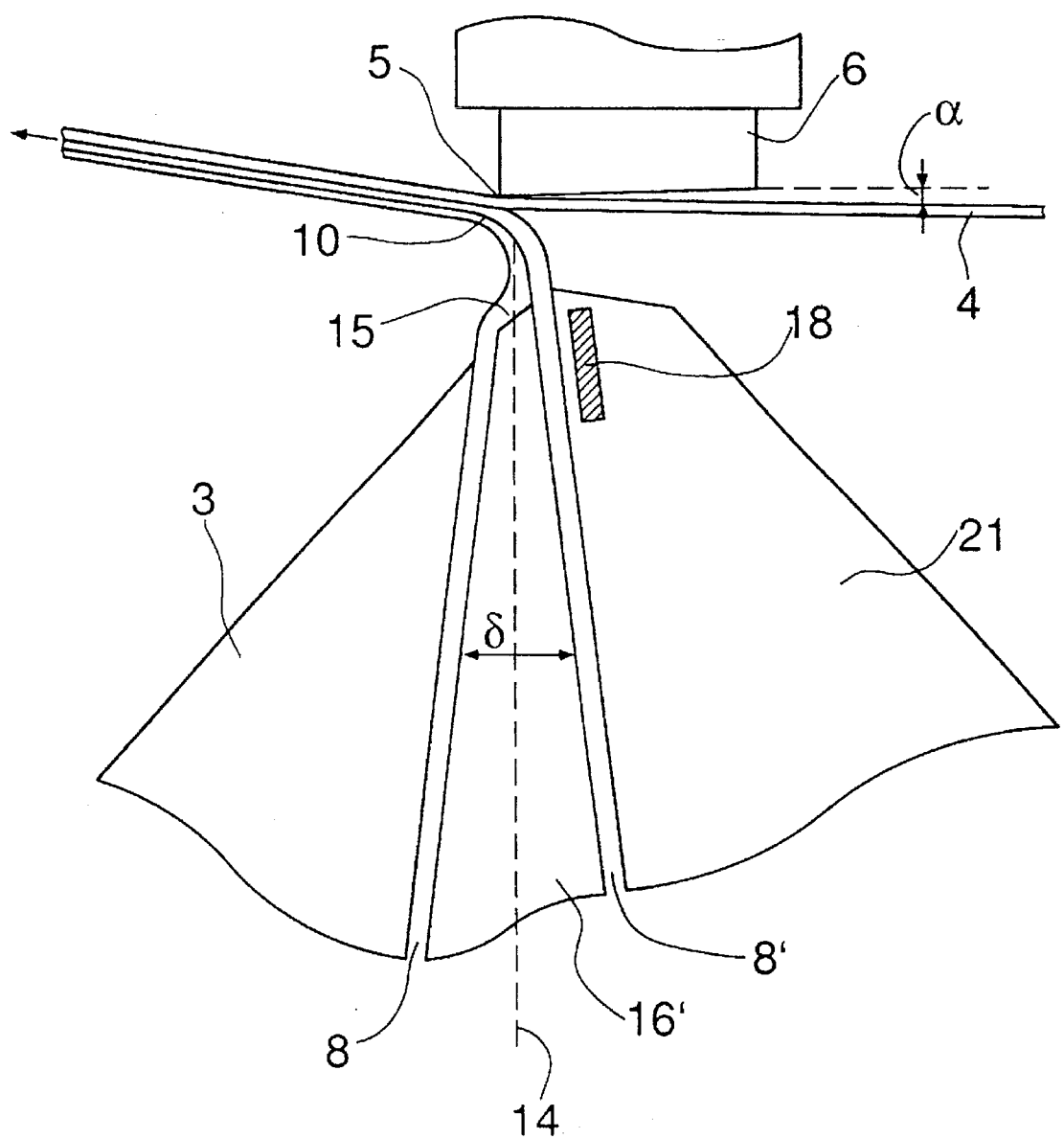
FIG. 2 shows a corresponding double slot coater.
Figure 3A:
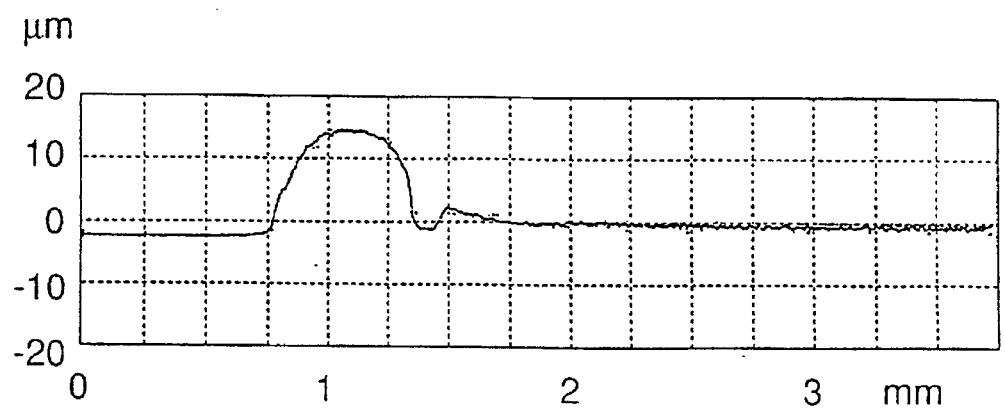
FIG. 3a shows an edge layer thickness profile, obtained using a conventional extrusion coater
Figure 3B:
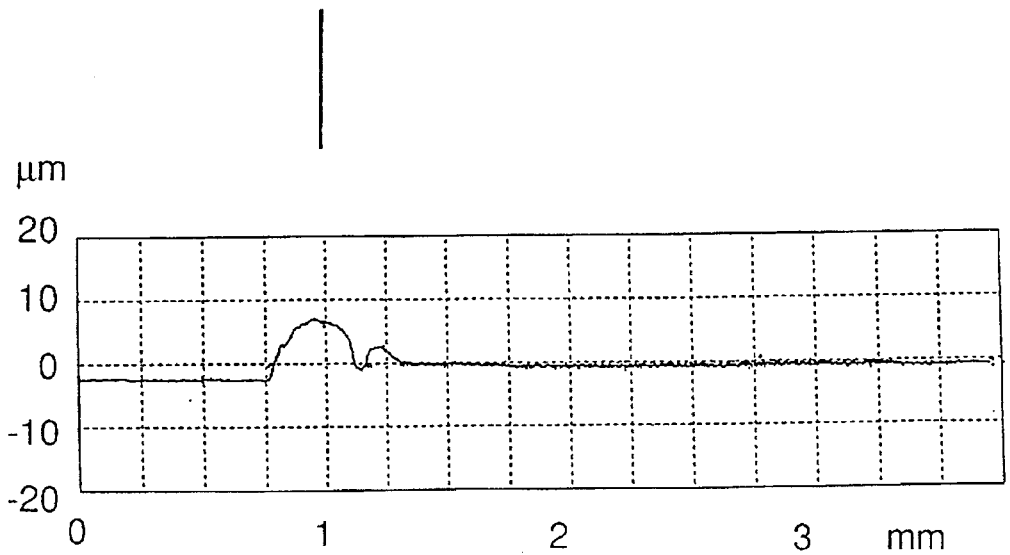
FIG. 3b shows a corresponding profile obtained using an extrusion coater according to FIG. 1.

The novel process can also be used on an extrusion coater having a plurality of coater slots. FIG. 2 shows, by way of example in this context, an extrusion coating arrangement having two coater slots (8, 8'), in which the lip magnet (18) is integrated in the lower lip (21). This arrangement is described, for example, in the German application with the file reference P 44 20 103. It consists of a lower lip (21), the center part (16') and the upper lip (3), with the line of symmetry (14) running perpendicular to the substrate (4). The dimension and positioning of the lip magnet in the version having only one coater slot can be essentially retained here. Such an arrangement could be used to produce a double-layer magnetic tape consisting of two magnetic layers having a reduced layer thickness compared with the prior art and a smaller edge bead, as demonstrated in the Example below.

EXAMPLE 3

| Components | Parts by weight |
| --- | --- |
| Lower layer | |
| Acicular $CrO_2$ ($H_c$ = 37 kA/m) | 100 |
| $\alpha$-$Fe_2O_3$ | 3 |
| Polyesterpolyurethane | 17 |
| Polyvinyl formal | 3 |
| Zinc stearate | 1.5 |
| Triethanoldiamine dioleate | 1 |
| Tetrahydrofuran | 225 |
| Upper layer | |
| Acicular $CrO_2$ ($H_c$ = 48 kA/m) | 100 |
| $\alpha$-$Fe_2O_3$ | 3 |
| Polyesterpolyurethane | 15 |
| Polyvinyl formal | 2.6 |
| Zinc stearate | 1.5 |
| Triethanoldiamine dioleate | 0.5 |
| Silicone oil | 0.1 |
| Tetrahydrofuran | 230 |

A completely stripe-free and nonwavy coating was obtained. The magnetic recording medium obtained had excellent magnetic and mechanical properties and only a minimum edge bead.

Without the lip magnet in the lower lip, the minimum dry layer thicknesses achievable were 2.7 µm for the upper layer and 3.3 µm for the lower layer. With the lip magnet, it was possible to achieve a layer thickness of 0.2 µm and 1.5 µm for the upper and lower layer, respectively, and the edge bead was once again reduced by a factor of 2.

In a further experiment, it was possible to achieve a thickness of 0.7 µm for the lower layer.

EXAMPLE 4

| Components | Parts by weight |
| --- | --- |
| Lower layer | |
| Acicular $CrO_2$ ($H_c$ = 37 kA/m) | 250 |
| $TiO_2$ (BET 55 $m^2/g$) | 750 |
| Carbon black (BET = 240 $m^2/g$) | 200 |
| Vinylpolymer having polar groups | 75 |
| Polyurethane having polar groups | 95 |
| Lubricant | 25 |
| Polyisocyanate | 30 |
| Solvent (tetrahydrofuran, dioxane) | 3000 |
| Upper layer | |
| Magnetizable metal powder ($H_c$ = 133 kA/m, BET = 5 $m^2/g$) | 1000 |
| $\alpha$-$Al_2O_3$ (particle size = 0.2 µm) | 80 |
| Vinyl polymer having polar groups | 77 |
| Polyurethane having polar groups | 77 |
| Phosphoric ester | 10 |
| Lubricant | 25 |
| Polyisocyanate | 22.5 |
| Solvent (THF, dioxane) | 4580 |

In the case of this double layer, a dry layer thickness of 0.2 µm could be achieved for the upper layer and one of 1.5 µm for the lower layer, using an integral lip magnet.

EXAMPLE 5

A double layer was cast, the lower layer having the composition according to Example 2 and the upper layer consisting of polymeric binder, lubricant, polyisocyanate and solvent. A satisfactory coating having a dry layer thickness of 0.2 µm for the upper layer and 0.4 µm for the lower layer could be achieved.

EXAMPLE 6

A triple layer arrangement whose individual layers had the following composition was cast in an extruder arrangement having three coater slots.

| Components | Parts by weight |
| --- | --- |
| Lower layer | |
| Co-doped $\gamma$-$Fe_2O_3$ ($H_c$ = 62 kA/m; BET = 42 $m^2/g$) | 870 |
| $\alpha$-$Al_2O_3$ (particle size = 0.25 µm) | 50 |
| Carbon black (BET = 240 $m^2/g$) | 80 |
| Vinyl polymer having polar groups | 70 |
| Polyurethane having polar groups | 100 |
| Lubricant | 40 |
| Polyisocyanate | 30 |
| Solvent (tetrahydrofuran, dioxane) | 2600 |
| Middle layer | |
| $TiO_2$ (BET = 55 $m^2/g$) | 1000 |
| Vinyl polymer having polar groups | 75 |
| Polyurethane having polar groups | 95 |
| Lubricant | 25 |
| Polyisocyanate | 30 |
| Solvent (tetrahydrofuran, dioxane) | 2700 |

Upper Layer

As for Example 4, upper layer.

By means of this layer arrangement, it was possible to achieve a satisfactory coating having the following dry layer thicknesses.

Upper layer: 0.2 µm

Middle layer: 1.0 µm

Lower layer: 1.0 µm

Figure 4:
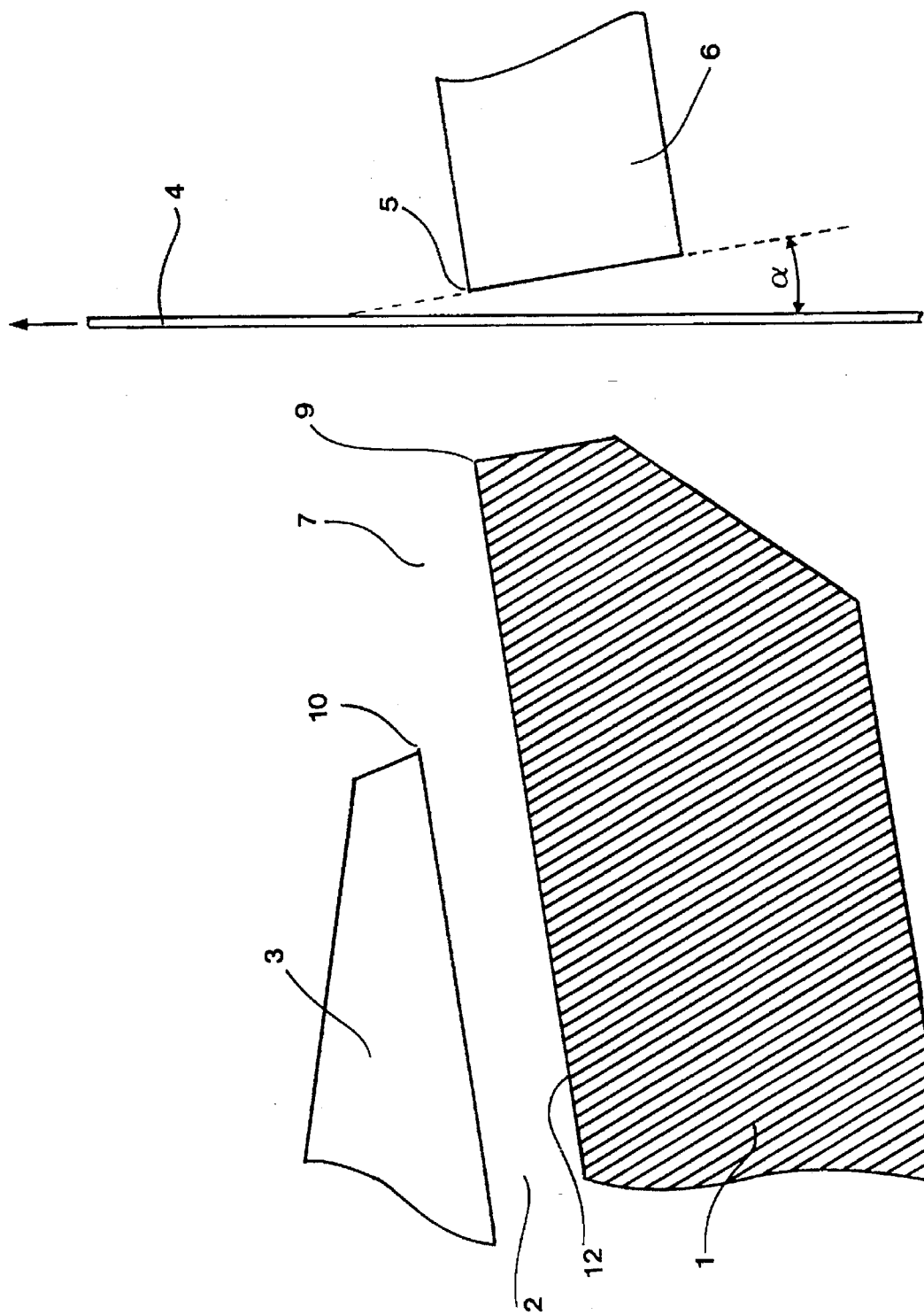
FIG. 4 shows a monoslot extrusion coater in which the lower lip is comprised of a magnetically soft highly permeable metal.

In another alternative, of the novel extrusion coater, no magnet is integrated in the lower lip, as shown in FIG. 1 or 2, but the material of the lower lip is magnetically soft, ie. highly permeable, for example consisting of Mu-metal, and the attracting magnet (6) is arranged in such a way that it produces a magnetic image in the lower lip as shown in FIG. 4, using the same reference numerals as in FIG 1. The crosshatching in the lower lip indicates the highly permeable metal. In this case, too, the advantages obtained according to the invention, ie. reduction in layer thickness with trouble-free coating and reduction of the edge bead, are obtained to the same extent if the field lines of the virtual magnet are perpendicular to the direction of flow of the dispersion.

The upper lip, lower lip and intermediate piece (16) usually consist of nonmagnetic stainless steel.

We claim:

1. An extrusion coater for the production of a magnetic recording medium, said magnetic recording medium comprising a nonmagnetic substrate having a front and rear surface, said front surface having applied thereon at least one magnetic dispersion comprising magnetic pigments having a coercive force, the magnetic pigments dispersed in a polymeric binder matrix, said coater comprising:

an upper lip having a first edge and a lower edge;

a lower lip having a first edge and an upper edge, said first edge of said upper lip being recessed relative to the first edge of said lower lip;

a right parallelepiped magnet arranged in said lower lip parallel to the upper edge of said lower lip, said magnet having field lines and a field strength at least as great as the coercive force of the magnetic pigments;

said upper lip and lower lip being arranged parallel to each other and defining a coater slot orifice through which said magnetic dispersion having a direction of flow towards said front surface of said substrate passes, said substrate being moved such that it passes said lower lip first followed by said upper lip; and said field lines of said magnet being perpendicular to the flow of the magnetic dispersion.

2. An extrusion coater as claimed in claim 1, further comprising:

a further right parallelepiped magnet having an upper edge which is arranged opposite the coater slot orifice and parallel to the rear surface of said substrate, said further magnet having a field strength at least as great as the coercive force of the magnetic pigments.

3. An extrusion coater for the production of a magnetic recording medium, said magnetic recording medium comprising a nonmagnetic substrate having a front and rear surface, said front surface having applied thereon at least one magnetic dispersion comprising magnetic pigments having a coercive force, said pigments dispersed in a polymeric binder matrix, said coater comprising:

an upper lip having a first edge and a lower edge;

a lower lip comprised of a magnetically soft highly permeable metal, said lower lip having a first edge and an upper edge, said first edge of said upper lip being recessed relative to the first edge of said lower lip, said upper and lower lip being arranged parallel to each other, said upper lip and lower lip defining a coater slot orifice through which said magnetic dispersion having a direction of flow towards said front surface of said substrate passes, said substrate being moved such that it passes said lower lip first followed by said upper lip; and a right parallelepiped magnet arranged opposite the coater slot and adjacent the rear surface of said substrate;

whereby said magnet is magnetically reflected in the lower lip to cause said lower lip to function as a virtual magnet in which field lines are reflected, said field lines being perpendicular to the flow of the magnetic dispersion in the coater slot.

* * * * *